Figure 1:
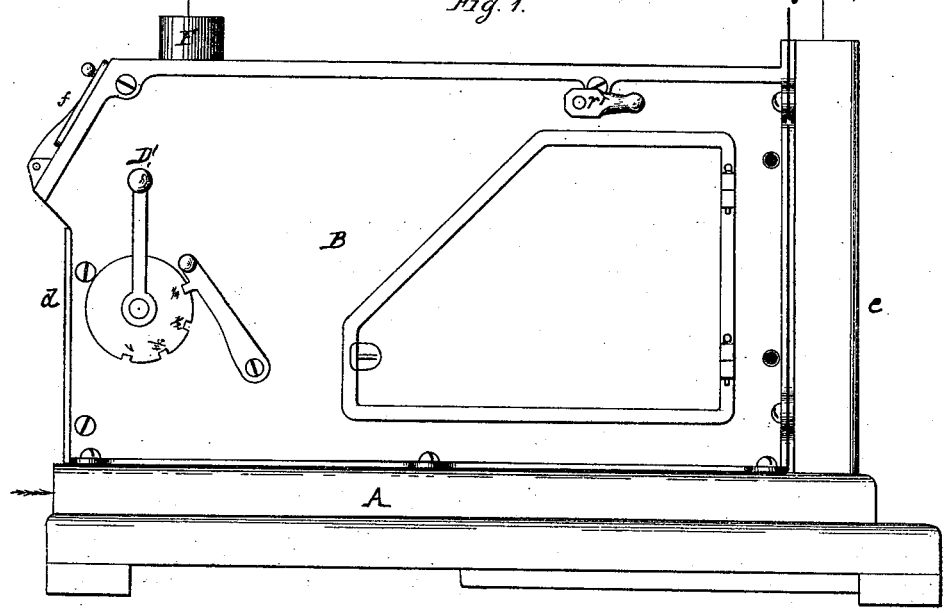

3 Sheets—Sheet 1.

R. EICKEMEYER.
STOVE.

No. 179,776.

Patented July 11, 1876.

Witnesses:
Philip F. Larner
A. B. Cauldwell

Inventor:
Rudolf Eickemeyer
By M. C. Stord
Attorney

N. PETERS, PHOTO-LITHOGRAPHER, WASHINGTON, D. C.

3 Sheets—Sheet 2.
R. EICKEMEYER.
STOVE.
No. 179,776. Patented July 11, 1876.
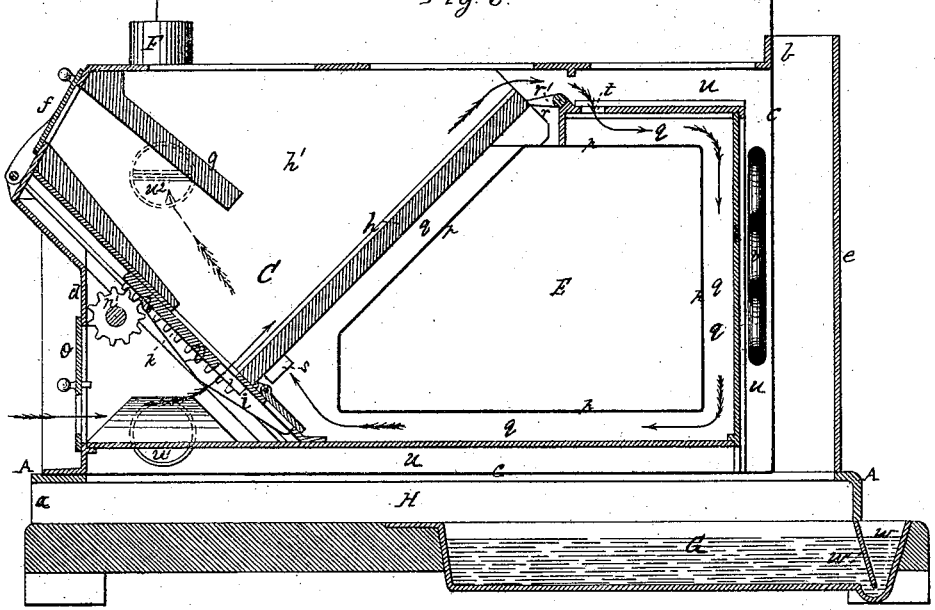
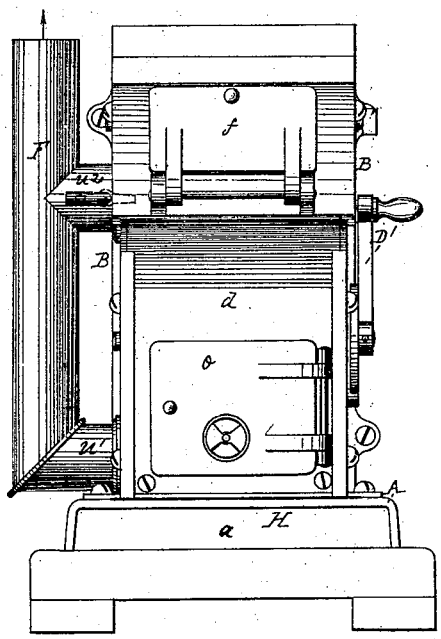
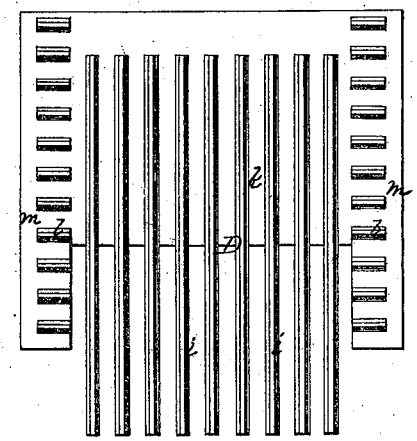
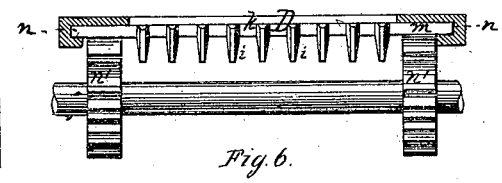
Witnesses
Philip F. Layner
A. B. Cauldwell
Inventor:
Rudolf Eickemeyer
By _____
Attorney
N. PETERS, PHOTO-LITHOGRAPHER, WASHINGTON, D. C.

R. EICKEMEYER.
STOVE.

No. 179,776.

3 Sheets—Sheet 3.

Patented July 11, 1876.

Witnesses:
Philip F. Larner
A. B. Cauldwell

Inventor:
Rudolf Eickemeyer,
By Wm. C. Wood
Attorney

UNITED STATES PATENT OFFICE.

RUDOLF EICKEMEYER, OF YONKERS, NEW YORK.

IMPROVEMENT IN STOVES.

Specification forming part of Letters Patent No. 179,776, dated July 11, 1876; application filed May 25, 1876.

*To all whom it may concern:*

Be it known that I, RUDOLF EICKEMEYER, of Yonkers, in the county of Westchester and State of New York, have invented certain new and useful Improvements in Stoves for Cooking and Heating; and I do hereby declare that the following specification, taken in connection with the drawings furnished and forming a part of the same, is a clear, true, and complete description thereof.

I have sought, through my improvements, a maximum utility, coupled with a minimum consumption, of fuel; and I have therefore devoted my attention not only to a complete control and utilization of the products of combustion after they have left the fire-pot, but also to a complete control and adjustment of the fire-pot itself.

The main feature of my invention consists in a cook-stove and heater, embodying in combination a fire-pot or combustion-chamber, an oven, an air-heating chamber, two independent ducts, one of which is an interior duct or flue, and the other an exterior duct, arranged to communicate with each other and with the fire-pot, and each of which communicates with a smoke-pipe by means of an independent passage, a damper for controlling the exit of the fire-pot at its junction with the two ducts, and a damper for controlling the exit of the interior duct at the smoke-pipe, whereby at will the combustion-chamber and the smoke-pipe may be placed into communication by the way of the interior duct and the exterior duct, or only by way of the interior duct, or a portion thereof.

A stove constructed in accordance with this portion of my invention may be used for boiling and broiling with a practically-direct discharge of the products of combustion into the smoke-pipe after they have traversed only a small portion of the interior duct. When required, also, for baking purposes the products of combustion traverse the interior duct on three sides of the oven, and, when required for all of these purposes, and also for heating, or for heating alone, the products of combustion traverse the exterior duct either after having made the entire circuit of the interior duct, or they may be wholly excluded from said duct.

Another feature of my invention consists in embodying in a cook-stove the combination, with a fire-pot, an oven, an interior duct next to the oven, and an exterior duct, of a water coil or chamber located in the exterior duct.

It is well known that when the water-coil is in the fire-pot a large body of burning fuel is always requisite, even for ordinary purposes, because of the deadening effect of the coil, and that when the coil is located between the fire-pot and oven the heating of the latter at the adjacent side is effected with difficulty.

In my improved stove the water-coil is located neither in the fire-pot, nor between it and the oven, but is located in the exterior duct, so that heat is applied thereto only after it has traversed the interior or oven-heating duct.

Another feature of my invention consists in a V-shaped fire-pot, provided with a grate which constitutes an inclined front thereof, and which can be moved to and from the opposite inclined back of the pot, so that when clinkers and stones gravitate to the grate-surface at the lower narrow portion of the fire-pot the grate can be moved so as to afford an opening through which clinkers may be freely discharged, and also whereby a free combustion of fuel is attained.

My invention further consists in a solid grate plate provided with bars, in combination with a fire-pot, and arranged so that the grate-plate may be moved across the bottom of the fire-pot, and made to wholly close the same, or afford any desired area of grate-surface.

My stove is provided with a grate-plate mounted in slide-bearings, a rack on the plate, a pinion, shaft, and crank for operating the grate; and my invention also consists in the combination, with the crank, of a dial-plate for convenience in adjustment; and, still further, in providing the crank with a stop-pawl for securing the grate in any desired position.

My invention further consists in the combination, with the air-heating chamber of a cook-stove and heater, of a vapor pan or reservoir, provided with a feeding-aperture and a recess in its bottom guarded by a trap-plate, which extends into the recess below the line of the bottom of the pan, whereby the pan is readily supplied with water, and the fumes of the kitchen prevented from entering the air-chamber.

The recess in the bottom of the pan will retain sufficient water to keep the trap closed, even after the water in the main portion of the pan has been wholly exhausted.

To more particularly describe my invention I will refer to the accompanying three sheets of drawings, in which—

Figure 2:
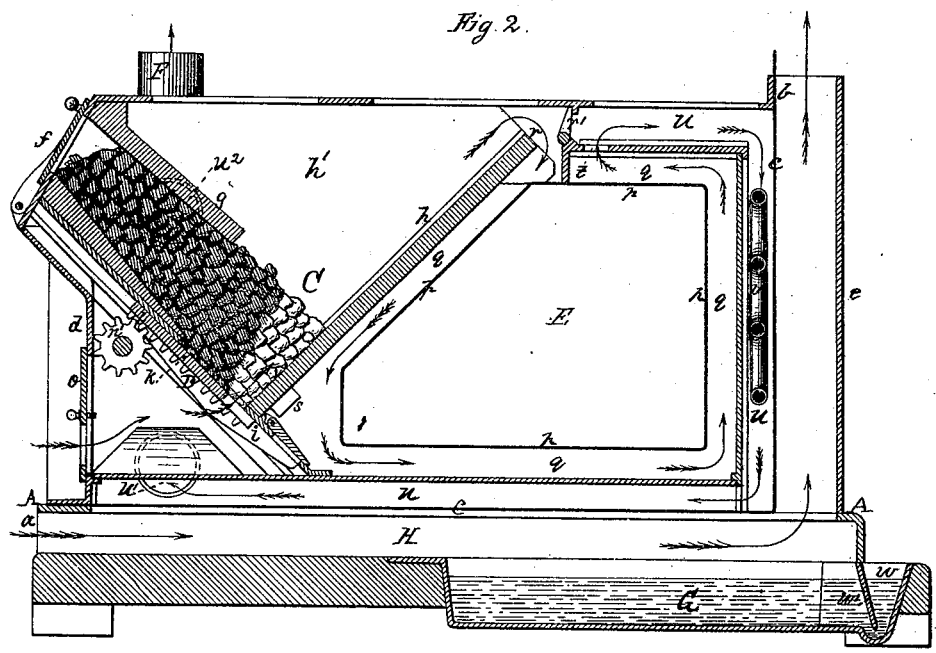
Figure 7:
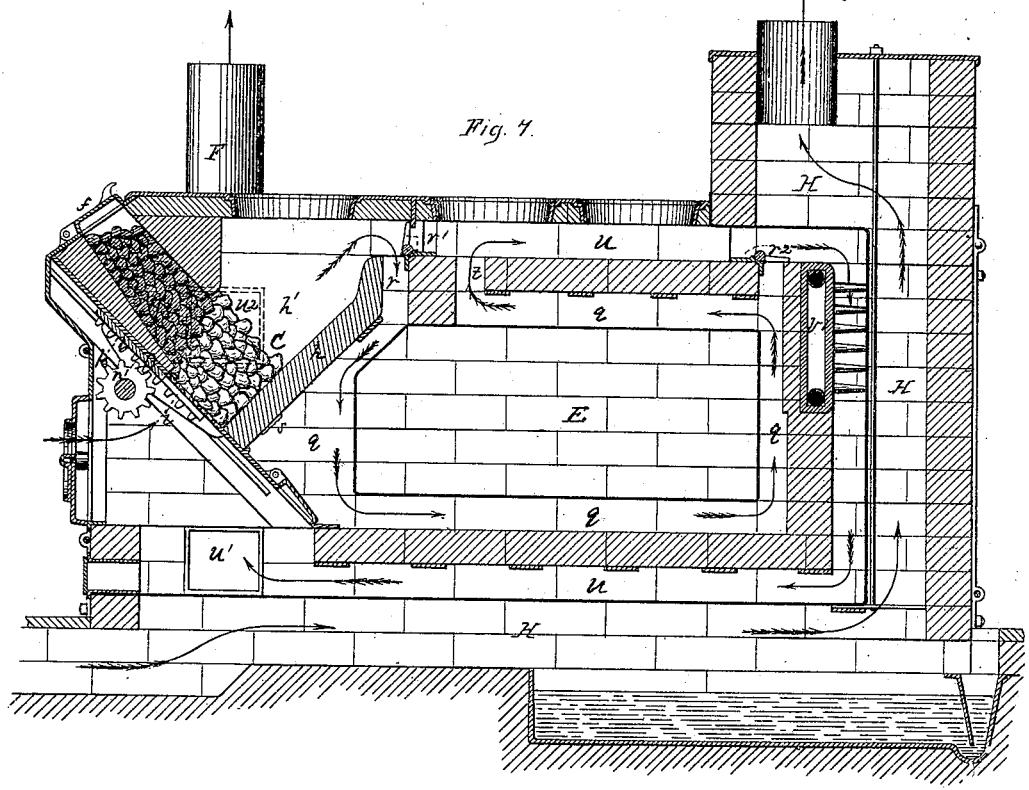
Figure 8:
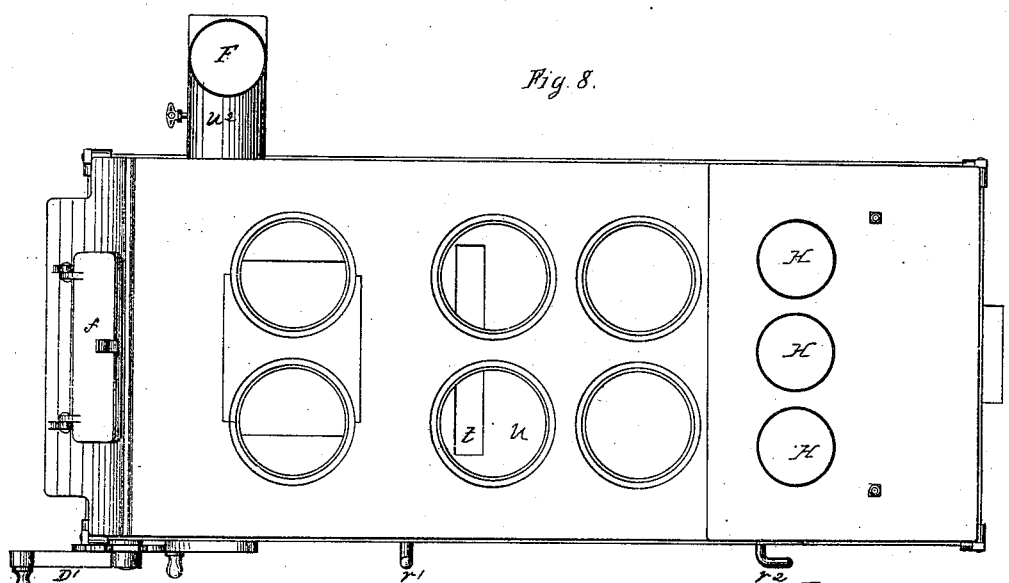

Figure 1, Sheet 1, represents in side elevation one of my improved stoves. Fig. 2 represents the same in longitudinal central vertical section as if charged with fuel, and arranged for cooking in all its branches, and for heating air. Fig. 3, Sheet 2, represents the same as in Fig. 2 arranged for cooking only. Fig. 4 represents the stove in front elevation. Fig. 5 represents the grate detached as if viewed from its lower side. Fig. 6 represents the grate in end view, with its slide bearings and the gearing by which it is operated and adjusted. Fig. 7, Sheet 3, represents in section a set range embodying my improvements. Fig. 8 represents the same in top view.

A denotes a hollow bed-plate, upon which the stove is mounted. Its interior constitutes a hot-air chamber, H, and it is provided with an induction-aperture, as at $a$, for the entrance of air supplied from a suitable cold-air flue. An upright portion of the hot-air chamber, as at $b$, at the rear of the stove, communicates with the interior of the bed-plate at the bottom. At the top the chamber may be connected with a flue leading to an upper apartment to be heated, or it may discharge the heated air into the room containing the stove, if the heat be there required. The bed-plate is cast with an open top, as indicated in Fig. 2, and its interior is separated from the flues of the stove by a thin heating-sheet, as at $c$, which extends from the front of the stove at its bottom to the rear, thence upward, thus forming the top and side of the air-heating chamber, with which the air, while passing through the chamber is in direct contact. The sides of the stove at B are mounted upon the base-plate, and they support the top and the several interior portions of the stove. The front end $d$ and back end $e$ are also mounted on the bed-plate and secured to the side. C denotes the fire-pot or combustion-chamber with an entrance at the front end of the stove near the top, having a tight door or cover, as at $f$. It is inclined inward and downward, and for a portion of its length is provided with an upper side, as at $g$, which renders said portion of the fire-pot a magazine, in the upper portion of which fuel will remain intact, and from which the grate may be continuously supplied. The back of the fire-pot is formed of a cast-iron plate, as at $h$, which is inclined upward and toward the rear, and this may or may not be protected with brick or other lining. The sides of the fire-pot at $h'$ are vertical, and parallel with the side plates B, and the spaces intervening constitute passages or flues for the exit of the smoke and gases to the smoke-pipe under certain circumstances hereafter described. The fire-pot has, therefore, two sloping sides and two vertical sides, which enables the fuel to settle downward freely, the ashes being concentrated at the junction of the sloping sides, from which they are readily removed. For securing a free delivery of fuel the magazine is enlarged gradually, the bottom-plate thereof being much thicker at the front or upper end than at the rear or lower end. The fresh fuel is delivered to the fire laterally in a line at right angles to the grate, although the movement of the fuel is in a line parallel with the grate. D denotes the grate, which is inclined downward and forward beyond the line of the back plate $h$, so that the fire-pot proper, which contains the burning fuel, is V-shaped.

The grate D is of novel construction, in that it is composed of a number of bars, $i$, which project from a solid plate, $k$, and is provided at each side with a rack-gear, as at $l$, and outside thereof with edges, as at $m$, which occupy lateral grooves $n$, as clearly illustrated in Figs. 5 and 6. This grate is moved up and down by a shaft with pinions $n'$, also shown in Fig. 6, and the crank D′, shown in Fig. 1. This crank is provided with a dial-plate having notches and plainly inscribed to show the position of the grate, and a catch-pawl, whereby the grate may be adjusted in any desired position. When fully elevated the entire bottom of the fire-pot will be an open grate-surface, and in proportion as the grate is lowered will the grate-surface be diminished by the presence of the solid plate $k$, which is capable of wholly closing the bottom of the fire-pot. The draft-door $o$ at the front of the stove opens to the ash-pit, and a register-valve in said door admits of reducing the draft to a minimum, while the door fully opened will result in full draft.

It will be seen that my adjustable grate not only regulates the quantity of air supplied to the fire, but it also properly proportions the quantity of fuel to be exposed to the air admitted, while, by the usual methods of controlling draft, the body of fuel exposed remains the same, whether much or little air is admitted. It will also be seen that no fresh fuel is ever thrown upon the surface of the burning coal, which will, therefore, under all circumstances, afford a good broiling-surface. The gases emanating from the adjacent heated fuel are brought into immediate contact with the bright burning coal, and are promptly consumed, instead of being wasted, as is the case when fresh coal is put upon the top surface of a fire and the gases escape to the smoke-flue. In Figs. 2 and 3 the grate is shown to be about one-quarter open, and in Fig. 7 the grate is shown to be fully opened.

A grate constructed in accordance with my invention has great practical value for use in stoves and heaters of all classes, and in all fuel-burning apparatus.

It will also be readily seen that the grate-plate may be moved by means of a shaft, levers, and links, instead of the rack and pinion, although I prefer the rack and pinion, because they are simple and easily operated.

E denotes the oven of the stove. Its walls, as at $p$, are composed of sheet metal, which unites at each side with the side plates. A single length of metal may be employed, which will require but one joint at the two connecting ends of the sheet, thus reducing to a minimum the liability of gases in the oven. The oven-walls $p$ constitute the sides of a duct, $q$, which surrounds the oven on top, bottom, and both ends. The interior duct $q$ has three openings, one of which, as at $r$, is an entrance communicating with the combustion-chamber. Another, as at $s$, is an exit communicating with the space between the sides $h'$ of the fire-pot and the side plates of the stove, and thence with the smoke-pipe; and the other, as at $t$, is both an entrance and an exit, according to requirements. The opening $r$ is provided with a damper, as at $r^1$, which performs a double service, in that it controls the opening $r$, and also the exterior duct $u$, which extends from said damper $r^1$, along the top, to the rear of the stove, thence downward to the bottom, thence to the front, and communicates with the smoke-pipe, as at $u'$, beneath the ash-pit. The ducts $q$ and $u$ are separated by plates or partitions which extend to each of the side plates. At the rear of the stove, in the duct $u$, is a heating-coil, as at $v$, for connection with suitable supply pipe and tank. For clearing the duct $q$ from soot, &c., a valved opening is provided below the grate which communicates with the ash-pit, into which the soot may be drawn by means of a hoe-shaped scraper or a shovel.

F denotes the smoke-pipe, which is located at the front of the stove, and communicates therewith near the bottom, as at $u^1$, the terminus of duct $u$, and also near the top of the stove, as shown in dotted lines at $u^2$, which communicates with the space between the side wall of the fire-pot and the side plate of the stove. The upper opening $u^2$ is provided with a damper.

G denotes a vapor-pan or water-reservoir for charging the air with vapor as it passes through the heating-chamber beneath the stove. A funnel-shaped opening or feeding-aperture, as at $w$, is provided at the rear of the stove for supplying water to the reservoir, and a trap-plate, $w'$, projects downward at that point into a recess formed in the bottom of the pan, to prevent the escape of the heated air and the entrance of fumes of the kitchen to the air chamber, even after the water in the main portion of the pan has been evaporated, while affording sufficient space below it for the entrance of water.

It will be seen that the water-pan is so located that the water is taken up by air which is only partially heated, and to such a degree as would be ordinarily desirable in an apartment. For instance, under ordinary circumstances the air in the portion of the chamber containing the pan would be about 70° or 75° Fahrenheit, and only a quantity of water due to that temperature would be taken up by the air. Although, in its passage through the heater, the temperature of the air will be raised, the water will remain therein, and when the hot air is mixed with the air of the apartment which is heated, the temperature of the heated air is reduced to about the degree at which the water was taken up by it, and I thus secure a desired degree of humidity.

The top of the stove is provided with openings and covers, as usual. Two of these are located above the combustion-chamber, and are susceptible for use in broiling or boiling. The third opening is near the rear of the stove, and is only of use in boiling when the duct $u$ is in service.

My stove is economical in the consumption of fuel, both by reason of the manner in which the fire is controlled, and by reason of the manner in which the heat afforded is utilized. So far as relates to the fire, it will be seen that as the coal is burned all clinkers and stone will gravitate to the bottom of the V-shaped fire-pot, and that they can readily be removed without disturbing the fire by turning the crank until the grate-bars are removed from junction with the lower end of the back-plate sufficiently to afford a free open space.

The extent of grate-surface is regulated at will by means of the crank, and it may be wholly closed, if desired. The grate is not liable to be obstructed by coal so as to prevent its movement, because the weight of the mass of coal is partially borne by the back plate. The body of coal is so exposed to the grate that it will be burned only in proportion to the quantity of air admitted through the grate.

The body of burning coal will always be of greater area than the open grate-surface, and it will thus always afford good facilities for broiling.

The burning fat from broiling operations will fall upon the back plate, and be consumed before reaching the coal, while its smoke will be promptly disposed of.

My stove is adapted to universal use, in that, as a summer stove, it can be operated so as to radiate a minimum of heat while used for cooking, and also when used as a winter stove it can be operated at full blast, and the heat therefrom utilized to a high degree.

When used, for instance, for boiling and broiling only, the volume of fire may be suitably adjusted. The damper $r^1$ is raised as in Fig. 2, and the damper at $u^2$ in the smoke-pipe opened. Either the front or middle hole in the top plate of the stove may be used for boiling, and the middle one for broiling, the gases and heat passing to the smoke-pipe through opening $r$, down at the rear of the back plate, along the duct at the front of the oven, through opening $s$.

If, in addition to broiling and boiling, the oven is required for baking, then the damper $r^1$ is lowered, as in Fig. 3, and smoke-pipe damper at $u^2$ still kept open. When thus adjusted the heat from the fire-chamber will enter duct $q$ at $t$, and continue therein along the top, rear end, and bottom of the oven, thence to the smoke-pipe via $u^2$.

If, in addition to its full cooking capacities, it is desired that the stove do service as a heater, then the smoke-pipe damper $u^2$ is closed, and damper $r^1$ raised, so as to leave entrance $r$ to duct $q$ open, in which case the heat from the fire-chamber will traverse the entire length of duct $q$ encircling the oven, enter the outer duct $u$ at $t$, and proceed therein in contact with the water-coil and the radiating-sheet $c$ of the hot-air chamber until, on arriving at the front of the stove beneath the ash-pit, it enters the foot of the smoke-pipe at $u^1$.

For extensive service set ranges will be preferable to the portable stove already described. A range embodying my improvements, as shown on Sheet 3, is well adapted for large families, hotels, &c. Instead of side plates, brick-work is employed. The hot-air chamber H, the interior and exterior ducts $q$ and $u$, and the fire-pot, are substantially the same as previously described. The several parts of the range are designated by letters of reference as previously employed in connection with the portable stove.

The water-heater $v'$, here shown, is not a coil, as in the stove. It is a rectangular chamber, provided with metal spurs, which project into the exterior duct for the purpose of absorbing the heat and imparting it to the water within the chamber. These spurs may be solid, or they may be short lengths of welded pipe attached to the chamber by weld-joints. When pipe is thus used, each piece should be inclined upward, so as to obviate the collection of sediment therein as far as possible.

A damper, at $r^2$, is shown in Fig. 7, which is not employed in the stove previously described.

It will be seen that at the rear of the heater, above the water-chamber, the heating-sheet between the exterior duct and the air-heating chamber, is extended horizontally from the rear toward the front of the stove so as to afford a more extended heating-surface. When the rear of the top plate of the stove is not required, the dampers $r^1$ and $r^2$ are both raised, in which case the draft from the fire-pot passes down the front end of the oven beneath it, upward at the rear, and into the outer duct at damper $r^2$, directly against the adjacent portion of the heating-sheet, thence downward, as in the portable stove. When the oven is not required, then both dampers, $r^1$ and $r^2$, are horizontal, and the draft from the fire-pot proceeds directly beneath the top plate to the rear, and thence as before, in which case all the holes of the top plate will meantime be available for boiling, and the front holes for broiling. The heating-sheet will be extended on each side through the brick-work, and auxiliary heating-sheets may be employed therewith, as described in Letters Patent issued to me on the 22d day of February, A. D. 1876.

It is to be distinctly understood that I am well aware that stoves and heaters embodying a portion or all of the novel features of my invention may be largely varied in construction without departing from the spirit of my invention.

I claim as new and desire to secure by these Letters Patent—

1. In a combined cook-stove and heater, the combination of a fire-pot and an oven, with an air-heating chamber, two independent ducts, which communicate with each other, with the fire-pot, and with the smoke-pipe by independent passages, and have dampers for controlling the entrance to said ducts at the fire-pot, and the exit from one of said ducts to the smoke-pipe, substantially as described, whereby the products of combustion may be conducted from the fire-pot to the smoke-pipe by way of one of said ducts, or both of them, as and for the purposes set forth.

2. In a cook-stove, the combination with a fire-pot and an oven, of an exterior and interior duct communicating with each other and with the fire-pot and smoke-pipe, of a water-heating coil or chamber located in the exterior duct, substantially as described, whereby the absorption of heat by the coil will neither affect the fire nor the oven, as set forth.

3. A fire-pot having a V-shaped fire-bed, with a solid back, and having an inclined grate in front, which can be moved to and from the bottom edge of the solid back, substantially as described, and for the purposes specified.

4. A solid grate-plate, provided with grate-bars which extend longitudinally from the plate, in combination with a fire-pot, and arranged to be moved across the lower end of the fire pot, substantially as described, whereby any desired degree of grate-surface may be employed, or the bottom of the fire-pot wholly closed, as set forth.

5. The combination, with a crank arranged to operate a sliding grate-plate, of a dial-plate, substantially as described, for enabling the ready and accurate adjustment of the grate surface, as set forth.

6. The combination, with an inclined sliding-grate, and a crank for operating the same, of a stop-pawl arranged to hold the crank and grate in any desired position, substantially as described.

7. The combination, with the air-heating chamber in a cooking and air-heating stove, of a vapor-pan, provided with a water-feeding aperture, and a recess in the bottom, guarded by a trap-plate which extends downward into the recess to a point below the main portion of the bottom of the pan, substantially as described, whereby the pan is readily supplied with water, and the fumes of the kitchen prevented from entering the air-chamber.

RUDOLF EICKEMEYER.

Witnesses:
R. SCHELLHAAS,
GEORGE NAN.